3,052,643
FOAMABLE VINYL RESIN COMPOSITION CONTAINING POLYHALOGENATED HYDROCARBON AND PROCESS FOR PRODUCING CELLULAR STRUCTURE THEREFROM
Dewey D. Lineberry, Louisville, Ky., assignor, by mesne assignments, to Union Carbide Corporation, New York, N.Y., a corporation of New York
No Drawing. Continuation of applications Ser. No. 541,063 and Ser. No. 541,064, Oct. 17, 1955. This application June 11, 1959, Ser. No. 819,546
28 Claims. (Cl. 260—2.5)

This invention relates generally to the production of formed vinyl resin products and more particularly to an improved process for producing a cellular or porous structure in a plasticized vinyl resin from a plastisol of such resin.

Plastisols, as defined in the art and as employed herein, are compositions containing finely divided polymer, generally of a vinyl chloride resin suspended in a liquid organic plasticizer for the polymer. At ordinary temperatures the resin particles are negligibly or only very slightly soluble in the plasticizer and the compositions are fluid, but upon being heated to an elevated temperature the resin particles undergo fusion and solvation in the plasticizer, and upon subsequent cooling a plasticized solid resin results.

In the Schwencke patent, U.S. 2,666,036, issued January 12, 1954, for Methods of Producing a Cellular Structure in a Plasticized Vinyl Ester Resin, a process is disclosed for producing a vinyl resin foam, by dispersing a low temperature boiling inert gas such as carbon dioxide, nitrous oxide, or helium in a vinyl resin plastisol. The process of that patent has come into considerable use; however, in that process it is necessary that a relatively high gas pressure must be employed in the dispersing step, in most instances at least about 300 to 500 p.s.i.g., in order to incorporate sufficient gas in the foam to produce the usually desired low density cellular structure in the fused foam. Pressures below 100 p.s.i. cannot, however, be employed in the Schwencke process. In order to produce a satisfactory low density foam for subsequent fusion and solvation, atomizing spray devices utilizing additional gas must be employed at the outlet of the high pressure dispersing zone.

During the spraying and forming of shaped foamed cellular structures by the Schwencke process, about 90 percent of the gas is lost to the atmosphere and only about 10 percent remaining to form cells. Consequently, large volumes of excess gas must be employed. This is undesirable in many operations. In most commercial operations it has been found that in order to disperse sufficient gas into the plastisol, simultaneous chilling and violent mechanical agitation of the gas plastisol mixture must be employed. This again generally requires special and expensive equipment.

While various chemical blowing agents have been used heretofore to produce an expanded cellular structure, these agents differ from those of the present invention by generating the foaming gas by decomposition or chemical reaction when the mass reaches the decomposition or reaction temperature of the chemical agent. With such foaming agents the cells are very suddenly formed and the use of closed molds is necessary to produce a commercially attractive product.

It is a primary object of the present invention to provide a low pressure process which is very efficient from the standpoint of foaming agent utilization and which may, if desired, be carried out without atomizing or spraying apparatus and in a simple open vessel or low pressure vessel equipped with an agitator instead of in a relatively complex highly pressurized agitated chilling apparatus heretofore employed in the art.

It is another object of this invention to provide a foamable composition which is free flowing before and after foaming and which produces cellular plasticized foam products superior to those previously available.

Other objects and advantages of the present invention will be obvious to those in the art.

According to the present invention, it has now been discovered that by dispersing or dissolving certain inert polyhalogenated hydrocarbon liquids or gases in a vinyl resin plastisol, superior free-flowing fluid foams are produced which may be flowed into molds or onto moving belts or otherwise formed into desired shapes and can be fused by simple heat treatment to produce deformable, resilient rubber-like cellular products. Moreover, in this invention it is not critically necessary to chill the plastisol during the dispersing step or to resort to spraying or atomization in order to produce low density cellular products. The physical structure of the fused foam of this invention is sponge-like with superior quality to any heretofore produced. The fact that the foaming agents of this process volatilize at a low temperature, at least about 150° F. below the plastisol fusing temperature, is quite important, for low temperature volatilization results in the formation of bubbles within the plastisol while the plastisol is still in a relatively fluid state before solvation of the resin has occurred. This permits a greater degree of expansion of the material resulting in lighter foams and, if desired, in an open rather than closed cell structure, for as the temperature rises to the fusing temperature the cell walls may readily break down between adjacent cells forming an interconnecting, open pore structure. Conversely, with chemical blowing agents which decompose to produce gas at or near the fusing temperature when the resin is relatively strong, closed cells usually result. The term "cellular structure" in the following description and in the claims is used to describe both the open, sponge-like interconnecting cell structure and the non-interconnected cellular structures in which most of the cells are closed.

The process of this invention and the compositions described herein are directed to vinyl resin plastisols, i.e., a 2-phase system in which a vinyl resin in small particulate form is dispersed and suspended in a plasticizer for the resin which has little or no solvating action on the resin at room temperature but will dissolve the resin at elevated temperature and cause it to fuse into a plasticized structure. By the terms "vinyl resins" and "vinyl chloride resins" as used herein is meant to include the vinyl chloride homopolymers and the copolymers, interpolymers and terpolymers of vinyl chloride with other ethylenically unsaturated monomers, and mixtures of the homopolymers with other vinyl chloride copolymers, interpolymers and terpolymers, and particularly those vinyl chloride resins containing a predominant amount of vinyl chloride polymerized therein, i.e., at least about 50 percent by weight and more. The preferred vinyl resins employed in this invention are those containing from 60 to 100 percent by weight of vinyl chloride in polymeric form.

The ethylenically unsaturated monomers which can be polymerized with vinyl chloride to form the copolymers, interpolymers and terpolymers include, for example, lower alkyl unsaturated esters, particularly vinyl acetate, partially hydrolyzed vinyl acetate, diethylmaleate, vinyl benzoate and the like, lower alkyl acrylates, such as methyl acrylate, ethyl acrylate, butyl acrylate, octyl acrylate, and the like, as well as the corresponding methacrylates, alkyl esters of unsaturated acids such as maleic and fumaric acids, as well as other copolymerizable compounds as unsaturated nitriles, for example, acrylonitrile, halogenated hydrocarbons such as vinylidene chloride and fluoride, vinyl fluoride, chlorotrifluoroethylene and like compounds and other polymerizable compounds containing ethylenic unsaturation. Of the copolymers, particularly preferred are the vinyl chloride-vinyl acetate copolymers, particularly those containing 85 percent or more of vinyl chloride polymerized therein.

The physical properties of the plastisol which is utilized have been found to be quite important. Ordinarily, plastisols are classified into three groups according to viscosity. These having viscosities of less than 10,000 centipoises are generally considered low viscosity plastisols. The intermediate range is 10,000 to 50,000 centipoises, and plastisols with viscosities of 50,000 centipoises and above are considered to be high viscosity plastisols. Experience has shown that both the low and intermediate viscosity plastisols can generally always be satifactorily foamed by the process of this invention with significant ease. While certain of the high viscosity plastisols (frequently called pastes) are somewhat viscous for satisfactory incorporation of the gaseous foaming agent, the use of normally liquid foaming agents of this invention or of volatile thinners can lower the viscosity of these high viscosity plastisols for satisfactory foaming. Most generally, the vinyl resin plastisols are made having from 30 to 70 weight percent of plasticizer, however, depending upon the desired plasticity of the resultant foam and the viscosity of the plastisol secured, greater or lesser amounts may be used.

In most instances emulsion polymerized stir-in type vinyl resins are preferred to grinding-type because the larger particle size of the stir-in resins produces a lower viscosity plastisol with the same ratio of resin to plasticizer, and this ratio often is more or less fixed by the properties desired in the fused foam. Generally, the higher the proportion of plasticizer, the less rigid the resultant foam will be. Stir-in resins which have an average particle size of about one to two microns are generally preferred because of ease in forming the plastisol in conventional mixing apparatus, but, by selecting appropriate plasticizers, viscosity within the critical range may usually be attained even though the resin particle size is considerably smaller.

When grinding-type resins are employed, it usually is desirable or necessary to use a ball or pebble mill to break up the agglomerated resin particles to a sufficient degree to form the dispersion. With grinding-type resins the particle size is usually much smaller, ranging from a few hundredths up to some larger fraction of a micron in average size, and the increased surface exposed to the solvent action of the plasticizer produces a less stable plastisol from a viscosity standpoint, for as solvation occurs at the resin-plasticizer interfaces, the viscosity increases. Of course, if the plastisol is to be made up for immediate foaming and use, this partial solvation is not particularly disadvantageous. Stir-in resins command a somewhat higher price than grinding types, but in most instances the higher price is justified since the cost of grinding is saved and since the resultant plastisol may be held for a relatively long period of time prior to foaming without the viscosity rise becoming excessive.

Any of the organic plasticizers for vinyl resins which have little or no significant solvating action on the vinyl resin at room temperatures can be used in this invention. Illustrative of some of the well known organic plasticizer are tricresyl phosphate, dioctyl phosphate, phthalate plasticizers, such as di-2-ethylhexyl phthalate and other well known plasticizers or mixtures of two or more plasticizers. Generally speaking, the plasticizer should not have a significant solvating action for the resin at room temperature at least until the plastisol is foamed, and it should also have sufficiently low viscosity so as to produce a free flowing fluid plastisol, preferably one having a viscosity within the range of about 5,000 to about 50,000 centipoises. The amount and kind of plasticizer is usually dictated by the properties desired in the fused foam, and, if a relatively stiff foam is desired, smaller quantities of a more fluid plasticizer may be employed as compared with larger quantities of a more viscous plasticizer for softer foams. Of course, the density and cell size of the foam also must be taken into account, but, because with the present invention it is possible to produce extremely light cellular products, there is much more latitude in the plastisol formulation than with the foaming process heretofore used.

Thus, as employed herein, the term "fluid plastisol" is meant to include those plastisols of a vinyl resin and plasticizer in amounts providing free-flowing features, i. e., pourable, paint-like mixtures, which can be an admixture of just resin and plasticizer, or can be resin, plasticizer and viscosity modifier such as liquid foaming agents, volatile diluents for the plastisol and the like, or any similar mixture yielding a plastisol of free-flowing features.

Usually, in making up the plastisol, it is advantageous to add a small amount of metal soap such as aluminum stearate or barium and cadmium soaps as a dispersing agent to aid in maintaining the resin particles in suspension prior to foaming. Similarly, if desired, pigments, fillers or stabilizers for the vinyl resins may be employed in the plastisols to control the color, stability or other properties of finished foam and in some instances the use of volatile thinners such as are used in organosols may be advantageous. Similarly, the liquid foaming agents of this invention can serve as thinners for the plastisol.

The foamable compositions of this invention are particularly advantageous, for they can be made up at one location for use at some other place at some later time. Moreover, if higher boiling normally liquid foaming agents are employed, the compositions may be stored or shipped under atmospheric pressure. If the lower boiling agents are used it is usually preferable to ship the compositions in sealed containers which will resist low pressures, particularly in summer months when higher temperatures may be encountered.

The relative amounts of the various constituents will, of course, vary depending upon the particular resin, plasticizer and foaming agent employed and the density, plasticity and other properties desired in the fused foam. However, in general, when low density foams are desired, for example, having densities of from about 1 to 10 pounds per cubic foot, the amounts of the constituents will be within the following limits:

| | Parts by weight |
|---|---|
| Plasticizer | 30 to 70 |
| Liquid foaming agent | 10 to 25 |
| Vinyl resin | 30 to 70 | not considering the fillers, stabilizers, pigments, etc., which are not critical in the composition. If higher density foamed products are desired, for example a shoe sole material which may have a density of from 15 to 35 pounds per cubic foot, the relative amount of foaming agent may be decreased to as low as 2% by weight of the composition.

The foaming agent or agents of the present invention should be chemically inert to both the vinyl resin and the plasticizer and chemically stable at temperatures up to and including the fusing temperature of the plastisol. If the foamable composition is to be held for any length of time before use, the foaming agent should have no significant solvating action on the vinyl resin in the plastisol although it can and often does decrease the viscosity of the plastisol. Desirably, the foaming agent should be miscible with or soluble in the plasticizer at least to a minor degree at the temperature at which the foaming agent is admixed with the plastisol, although such is not critical with all of the foaming agents encompassed in this invention.

The polyhalogenated saturated hydrocarbons having atmospheric boiling points between about minus 40° F. and below plus 175° F. have been discovered in this invention to provide these superior plasticized vinyl foams. Thus, these polyhalogenated hydrocarbons can be normally liquid or normally gaseous compounds, and can be employed in either the liquid or gaseous state.

The physical and chemical properties of the foaming agents are quite important with regard to the manner in which the process is conducted. The normally liquid agents having atmospheric boiling points of at least ambient or room temperature can be conveniently added to the plastisol or plasticizer without resorting to super-atmospheric pressure to maintain it in the liquid phase. Furthermore, the boiling point must be considerably lower than the fusing temperature of the plastisol so that expansion and cell or pore formation will occur prior to fusion and solvation as the temperature is raised from room temperature to the fusing temperature of the plastisol. Most vinyl resin plastisols fuse best at temperatures in the range of 300° F. to 400° F., and it is desirable to employ a liquid foaming agent boiling at least about 150° F. below the fusing temperature. Thus, the normally liquid foaming agents should usually have an atmospheric boiling point below about 175° F.

In distinct contrast to the prior process which utilized gases boiling at very low temperatures from −462° F. for helium to −109° F. for carbon dioxide, a gaseous foaming agent of this invention having an atmospheric boiling point of not less than about −40° F. nor much higher than the temperature of the plastisol at the time of foaming must be employed. The radical difference between the present process and the prior process is more readily appreciated by referring to the difference in temperature between the boiling point of the gaseous foaming agent and the temperature at which the plastisol is admixed with the gas. In the present process with these polyhalogenated saturated hydrocarbons, the plastisol temperature during admixture will generally be not more than about 120° F. above the atmospheric boiling point of the gas. In the prior process the gaseous agents boiled at temperatures between about 500° F. to 150° F. below the mixing temperature.

The following polyhalogenated saturated hydrocarbons are representative of suitable foaming agents for the process of this invention:

| Gaseous Foaming Agent | Atmospheric Pressure Boiling Point, °F. |
| --- | --- |
| monochloro difluoro methane (Freon 22) | −41 |
| dichloro difluoro methane (Freon 12) | −21 |
| 1, 2 dichloro 1, 1, 2, 2, tetrafluoro ethane (Freon 114) | +38 |
| 1,1,1 trichloro 2,2,2 trifluoro ethane | +45.8 |
| dichloro monofluoro methane (Freon 21) | +48 |
| 1,2 difluoro ethane | +50 |
| 1,1 dichloro ethane | +57.3 |
| 1,1,1 trichloro ethane | +74.1 |
| trichloro monofluoro methane (Freon 11) | +74.7 |
| methylene chloride | +104.5 |
| carbon tetrachloride | +170 |

The above listing is to be regarded in exemplification and not restriction to the useful compounds. Bromine and iodine substituted polyhalogenated compounds having similar boiling points can likewise be used in this process, as well as other polyhalogenated saturated hydrocarbons not listed above. The preferred compounds of this invention are the non-toxic, non-explosive and non-inflammable inert agents which have at least two aliphatic carbon atoms and from 2 to 6 inclusive halogen atoms attached to said carbon atoms. We find it much simpler, however, to employ non-hazardous agents such as the Freons which are readily and commercially available at low cost. Incidentally, since greater amounts of the higher molecular weight agents are required to produce a given volume of gas, it is frequently less expensive to use smaller amounts of a lower molecular weight agent which may be more costly than a heavier agent on a weight basis.

Briefly described this process involves the following steps:

(1) Admixing the polyhalogenated hydrocarbon foaming agent into the fluid plastisol at a temperature below the solvation or fusing temperature of the resin in the plasticizer, and if desired, under pressure greater than atmospheric but less than about 100 p.s.i.g.;

(2) Changing the ambient conditions on the thus-formed admixture, i.e., releasing the pressure and/or heating the admixture, to form a three-phase fluid form;

(3) Forming the fluid foam into a desired shape such as by flowing it onto a moving conveyor belt or into suitable mold, which step can be, if desired, simultaneous with the step of changing ambient conditions;

(4) Heating the foam to the solvation or fusing temperature of the plastisol (300° F. to 400° F.) to effect solvation of the resin into the plasticizer, such as by transfer of heat to the foam as in oven heating or by generation of the heat within the foam as in high frequency dielectric heating;

(5) Cooling the fused foam to a lower temperature at which it is form-retaining for removal from the mold or belt.

Prior to the fusing step, the foam is normally a three-phase system, namely, liquid plasticizer which can contain a certain amount of dissolved foaming agent, depending upon the solubility thereof, undissolved minute bubbles of foaming agent dispersed throughout the plasticizer, and particles of resin suspended in the plasticizer. At this stage, depending upon the relative solubility of the foaming agent and the fineness of the bubbles, the fluent mass may appear as a creamy foam much like whipped cream or an almost clear liquid. There are, however, two techniques for effecting the solution of the foaming agent in the plasticizer to form the composition of our invention, which techniques are quite simple to carry out and make it possible to form a stable plastisol-foaming agent composition which will successively foam and fuse to produce the desired structure upon heating. These techniques can be roughly termed the liquid phase admixing and the gaseous phase admixing. In the liquid phase technique, either of two relatively simple methods may be used. The first method is to maintain the foaming agent in liquid phase at a temperature below its atmospheric boiling point and then add the liquid agent to the plasticizer or plastisol which may, if desired, be at a higher temperature. As the liquid agent goes into solution its temperature increases and approaches the plasticizer temperature, but it is simultaneously diluted so that its vapor pressure is decreased to such extent that the combined vapor pressure of the plasticizer-foaming agent solution is less than atmospheric. The second arrangement is also simple but requires a closed mixing vessel for effecting solution. The plastisol or plasticizer is charged into the mixing vessel along with foaming agent under sufficient pressure to maintain the agent in the liquid state. As solution of the foaming agent occurs the pressure in the vessel decreases to such extent that the resultant liquid can be withdrawn to a zone of atmospheric pressure and does not foam until heated above room temperature. Dichloro monofluoro methane (Freon 21) is a very satisfactory agent to employ in this manner, and it may be dissolved in the plasticizer either before or after the plastisol is formed.

In certain instances where a highly soluble foaming agent boiling close to atmospheric pressure is added to a plastisol, the novel composition of the present invention may result if the foaming agent solubility is such that it completely dissolves in the plasticizer to produce a two-phase system free from bubbles.

Thus, it is seen that it is not necessarily critical in this invention that the foamable composition be solely two phase or solely three phase.

The solubility of the foaming agent in the plastisol plays an important part in the process of this invention and the improved results achieved thereby. For example, tests show that carbon dioxide is only very slightly soluble in conventional plastisols (about 0.7 gram of carbon dioxide can be dissolved in 1000 grams of a dioctyl phthalate-n-butyl benzyl phthalate-polyvinyl chloride plastisol). In contrast, for example, dichloro difluoro methane (Freon 12) is soluble in the same plastisol under the same conditions of temperature and pressure to the extent of 9.7 grams per 1000 grams of plastisol and accordingly is about 15 times as soluble as carbon dioxide. The higher boiling foaming agents such as 1,1 dichloro ethane and trichloro monofluoro methane have even greater solubilities, and the superiority of this process and the products thereof over the prior process and products may well result from the greater solubility of the gases.

The gaseous technique of this invention is particularly useful for the normally gaseous foaming agents having higher atmospheric boiling points, but is also usable for normally liquid agents. In this procedure the foaming agent can be incorporated into plastisols maintained either above or below the atmospheric boiling point of the gaseous agent, as part liquids or all gas or under pressure or not, as desired. The usual gas procedure is to vaporize a portion of the foaming agent and provide a supply of the foaming gas under pressure. This gas may be conducted to a mixer containing the plastisol and admixed therewith. If the temperature of the plastisol is sufficiently low the gas may dissolve completely to form a two-phase system (liquid plasticizer containing dissolved foaming agent and solid resin particles). On the other hand, if the temperature is higher a three-phase system such as is described above may be formed. If a two-phase system is formed in which the vapor pressure of the dissolved agent is greater than atmospheric pressure the composition will form a three-phase foam upon a change of the ambient pressure, i.e., reduction of the pressure to atmospheric.

In contrast, if the vapor pressure of the dissolved agent is less than atmospheric pressure a foam will not be formed upon reduction of the pressure to atmospheric but may be formed by changing the ambient temperature, i.e., heating the plastisol. The formation and utilization of such two-phase systems or compositions in the production of cellular products is readily conducted at atmospheric pressure by merely admixing the liquid agent and the plastisol in a suitable vessel.

The liquid foaming agent is preferably added to the plastisol, but in certain instances, as where a more viscous plasticizer or plastisol is to be employed, it may be advantageous to incorporate all or a portion of the liquid foaming agent in the plasticizer prior to dispersing the resin in the plasticizer. The relative amount of the foaming agent incorporated in the plasticizer is important, as it is determinative of the density of the finished material. In most instances the amount of foaming agent should be between about 5% and about 15% by weight of the total plastisol and foaming agent weight, although as previously stated, it may be as low as 2% by weight of the composition. This relative amount of the liquid foaming agent to be used may be readily calculated by using as the volume of each pound mol of agent 359 cubic feet, and computing the number of mols required per pound of plastisol to give the desired density. Thus, the weight of foaming agent required depends upon the molecular weight of the particular agent and the density desired in the foam. Usually, the amount required will be slightly above the calculated amount, i.e., within the range of about 10% to 30% greater than the quantity calculated to produce the requisite volume in the foamed and fused resin because of losses and leakage in the process.

It is desirable that when employing the liquid foaming agents, the agent be soluble in the plasticizer at least to such extent that all of the foaming agent employed will be dissolved at the time of admixture with the plastisol or plasticizer, as the case may be. If complete solution does not occur, droplets of liquid foaming agent may be present in the plastisol, and when it is heated to form cells the droplets may suddenly vaporize as they reach the boiling point of the foaming agent. This is undesirable and causes rejects of molded articles, for such sudden formation of relatively large masses of vapor within the very fluid plastisol produces large voids or blemishes in the finished foam instead of a uniform, well distributed cell structure. By the same token, droplets of water, which are immiscible in the plasticizer, may produce this effect, and are to be avoided.

On the other hand, with the foaming agent completely dissolved in the plasticizer, the emergence of the vapor bubbles is very gradual as the temperature rises, for the vapor pressure of the dissolved foaming agent tends to be a function of both the temperature and the relative concentration of the foaming agent in the plasticizer. Thus, as the temperature rises the vapor pressure of the dissolved foaming agent rises until some of it exceeds the ambient pressure. Then some vaporization occurs, but this vaporization tends to reduce the concentration of the foaming agent in the plasticizer, tending to lower the vapor pressure exerted. In this manner the foaming agent vaporizes quite slowly from the plasticizer forming the desired cellular or porous structure in the plastisol.

Thus, as is seen, the change in ambient conditions on the foamable composition forms a three phase system of gas bubbles entrapped in the liquid plasticizer in which the solid resin is suspended. Contrary to that system employed with other gaseous foaming agents, the three phase foamed composition of this invention is free-flowing and does not have to be sprayed or atomized into the molds when shaped cellular objects are made. Another significant advantage of the free-flowing characteristics of the foamed composition is the self-leveling nature, which in open mold applications yields a porous surface whereas with non-self-leveling foams, the surface must be scraped by doctor blade or otherwise which tends to collapse the foam on the then-formed surface and produce a skin effect significantly different from the open cell surface of these foams.

Curing or fusing of these foamed compositions is accomplished by heating to elevated temperatures, at least sufficent to effect solvation of the resin in the plasticizer and gel the plastisol. The gelling retains the foamed cellular structure of the composition and further heating fuses the resin. Quite often there is only a minor temperature differential between the gelation and fusion temperature, and most often these temperatures are within the range of 300–400° F., although some latitude of gelation and fusing temperature of the plastisol is to be expected, depending upon the particular plasticizer, the resin, and the solvating temperature of the resin in the plasticizer.

Although the invention has been described in a number of specific embodiments, it is to be understood that variations thereof may be practiced without departing from its spirit or scope.

This application is a continuation of applications Serial Nos. 541,063 and 541,064, both filed October 17, 1955, and now abandoned.

The following specific examples are illustrative of the novel process and composition of our invention. Unless otherwise specified, all parts are parts by weight.

Example I

A plastisol was prepared containing the following substances:

| | Parts |
|---|---|
| Polyvinyl chloride (Geon 121) | 500 |
| Dioctyl phthalate | 250 |
| n-Butyl benzyl phthalate (Santicizer–160, Monsanto) | 250 |
| Barium-cadmium soap (Barca 10) | 10 |

A charge of this plastisol at 70° F. was placed in a pressure vessel equipped with an agitator and gaseous dichloro difluoro methane (Freon 12) was introduced into the vessel at a pressure of about 60 pounds per square inch gage. The agitator was operated, and as the gas dissolved and was dispersed in the plastisol, additional gas was introduced to maintain the 60 pounds per square inch gage pressure. During this mixing the plastisol temperature remained about 70° F. The difference between the foaming pressure (60 p.s.i.g.) and the saturated vapor pressure of the gas at foaming temperature (70 p.s.i.g.) was about 10 pounds per square inch. The time of mixing was about five minutes, and at the end of this time the gas inlet valve was closed and an outlet valve at the bottom of the vessel was opened to allow the gas pressure to blow the resultant foam out of the pressure vessel as it was required. The unfused foam was an extremely stable free-flowing creamy liquid. This foam was charged into rectangular open molds to a depth of about one quarter inch and was then fused in a dielectric heating apparatus by rapidly heating to a temperature of about 325° F. About one-half minute was required to raise the foam temperature to 325° F. The fused foam was found to have an excellent cellular structure and a density of 5.2 pounds per cubic foot. Similar samples were fused in an ordinary oven maintained at 325° F. for fifteen minutes. The density of these samples was about five pounds per cubic foot. The resiliency of all the samples was such as to render the material excellent for use in seat cushions, mattresses or the like.

Example II

To obtain a comparison with the prior process, the method of Example I was repeated using carbon dioxide as the foaming agent. The gas pressure during mixing was 250 pounds per square inch gage. All other conditions were identical with those of Example I. The density of the fused foam was 9.0 pounds per cubic foot. Thus, it will be apparent that the fused foam density was about twice as great using carbon dioxide as the foaming agent as with dichloro difluoro methane despite the fact that about four times the pressure was used for the carbon dioxide. The difference between the foaming pressure and the saturated vapor pressure of the gas at foaming temperature was about 700 pounds per square inch, and the quantity of carbon dioxide required was many times the amount of the foaming agent of Example I.

Example III

The method of Example I was repeated using dichloro difluoro methane (Freon 12) as the foaming agent at a pressure of 100 pounds per square inch gage. This somewhat higher pressure was obtained by warming the cylinder containing the foaming agent to a temperature of about 95° F. Thus, the gas as initially introduced into contact with the plastisol was warmer than the plastisol, and it in effect liquefied and dissolved simultaneously in the cooler plastisol, for its saturated vapor pressure at 70° F. was less than the applied pressure. This is a convenient method of obtaining solution of large quantities of foaming agent in the plastisol. As in Example I the time of mixing was about five minutes, and during mixing the plastisol temperature remained about 70° F. At the end of the mixing period the mixer outlet valve was opened and the thus treated plastisol was filled into molds. As the plastisol emerged the dissolved foaming agent vaporized to form a free-flowing foam. The filled molds were subjected to dielectric and oven heating as in Example I to effect fusion in two different ways. The density of the fused foam was about 3.5 pounds per cubic foot regardless of the fusing method.

Example IV

The procedure of Example III was carried out upon a somewhat different plastisol formed of the following:

| | Parts |
|---|---|
| Polyvinyl chloride (Geon 121) | 500 |
| Dioctyl phthalate | 200 |
| n-Butyl benzyl phthalate | 200 |
| Barium-cadmium soap | 10 |

This plastisol contained 20% less plasticizer than the plastisol of Example III and was more viscous. The resulting fused foam had a good cell structure but much higher density than the fused foam of Example III. The foam density of the samples formed from the less viscous plastisol ranged from 7.8 to 10 pounds per cubic foot.

Example V

The method of Example I was repeated except that the temperature of the plastisol was maintained at 87° F. The gas pressure was sixty pounds per square inch gage as in Example I. The fused foam was found to have a density of 8.5. By comparing the results of this example with those of Example I it will be seen that the temperature of the plastisol at the time of gas incorporation has a considerable effect upon the fused foam density. Generally, the lower the plastisol temperature during mixing the more gas which is incorporated therein and the lower the density of the fused foam.

Example VI

The process of Example I was repeated using ammonia as the foaming agent instead of dichloro difluoro methane. The applied pressure during mixing of the agent and the plastisol was about 100 p.s.i.g. The fused foam had a density of about five pounds per cubic foot. The fumes of the ammonia were found to be very noxious and had to be vented outside the building. The use of ammonia is not generally satisfactory because of the difficulties in venting these fumes which are released from the unfused foam as well as during fusing. Moreover, it has been found that unfused foam formed by admixing ammonia in a plastisol will not keep as well as unfused foams formed with halogen substituted hydrocarbons as foaming agents.

Example VII

The method of Example I was repeated utilizing 1,2 dichloro tetrafluoro ethane (Freon 114) as a foaming agent. The pressure during admixture of the agent with the plastisol was varied from 50 to 100 pounds per square inch gage. The temperature of the plastisol during mixing was 80° F. With a pressure of 50 p.s.i.g. the resulting fused foam had a density of eight pounds per cubic inch. When the pressure was 100 p.s.i.g. the densities were found to be considerably lower approaching three pounds per cubic foot.

Example VIII

The method of Example VII was repeated using monochloro difluoro methane (Freon 22) and the same temperature and pressures as in that example. The fused foam had a density of 6.6 pounds per cubic foot when the gas dispersion step was conducted at 50 p.s.i.g. and again higher pressures resulted in even less dense fused foam.

Example IX

The plastisol of Example I was pumped at a rate of about fifty pounds per hour through an annular passage heat exchanger having an outer jacket space to which liquid ammonia refrigerant was supplied. The annular passage was formed by a cylindrical heat transfer wall, the exterior of which was in contact with the liquid ammonia, and a rotatable mutator shaft, equipped with scraper blades which continually removed chilled plastisol from the heat transfer wall, was rotated at a high speed. The plastisol entered the annular passage at one end at a temperature of about 80° F. and emerged from the other end at a temperature of about 30° F. Dichloro difluoro methane (Freon 12) was injected into the annular passage at the inlet end at sufficient pressure to maintain a back pressure within the annular space of about 45 to 65 p.s.i.g.

During passage through the annular space, which was about 12 inches in length, the plastisol and gas were thoroughly mixed to form a stable foam which emerged continually from the outlet end and was filled into molds as in Example I. The foam in the filled molds was fused as in Example I and excellent fused foams having densities as low as about three pounds per cubic foot were obtained.

The operating conditions were varied in order to produce different densities in the fused foams. The following table gives the operating conditions and results for a number of such tests.

| Run No. | Outlet Temp., °F. | Back pressure, p.s.i.g. | Density lbs./cu. ft. |
| --- | --- | --- | --- |
| 1 | 35 | 60 | Too light. |
| 2 | 32 | 64 | 6.5. |
| 3 | 28 | 48 | 3.2. |
| 4 | 24 | 52 | 4.5. |
| 5 | 28 | 52 | 6.75. |
| 6 | 32 | 53 | 8.4. |

The apparent lack of correlation between fused foam density and back pressure or outlet temperature is due to the fact that density was controlled primarily by varying the rate of addition of the gas. This produced concomitant variations in temperature and back pressure. It was found that very good control of product density can be achieved conducting the operation at a predetermined back pressure and outlet temperature and varying the rate of gas supply.

When foams having densities greater than about six pounds per cubic foot were produced, the cooled plastisol-gas mixture was found to emerge much as a liquid rather than a foam. The gas was very finely dispersed in virtually invisible bubbles, and, apparently, no gas was liberated from the plastisol foam either prior to or during fusing. At lower densities, the bubbles were larger and the mixture appeared to be more of a true foam, but still the amount of gas lost from the foam prior to and during fusing was extremely slight compared with the losses experienced with the prior carbon dioxide process.

*Example X*

The following materials were mixed to form a plastisol in the conventional manner:

| | Parts |
| --- | --- |
| Vinyl chloride resin (Vipla P) | 500 |
| Dioctyl phthalate | 375 |
| Tricresyl phosphate | 125 |
| Barium-cadmium soap (Barca 10) | 10 |

A portion of this plastisol was placed in an agitator equipped, closed mixing vessel provided with external cooling coils. Ice water was pumped through the coils to cool the plastisol and relatively warm dichloro difluoro methane (Freon 12) was introduced into the upper portion of the mixing vessel. The gas pressure was maintained at about 95 p.s.i.g. for a period of six minutes during which time the plastisol was agitated to completely disperse the gaseous foaming agent in the plastisol.

Next, the plastisol foam was withdrawn from the mixing vessel through a screen equipped nozzle and filled into molds which were placed in a dielectric heating apparatus for fusing. Fusing was effected by rapidly heating the foam to about 350° F. The cooled, fused foam was removed from the molds and the density was measured. The density was found to be from 4.9 to 6.3 pounds per cubic foot. The cell structure was very fine. Similar tests made with plastisols consisting of the same plasticizers in comparable amounts but different polyvinyl chloride resins, namely, Solvic 334, Corvic 65/42 and Corvic PM produced satisfactory fused foams but the densities were considerably higher, as follows:

| | Lbs./cu. ft. |
| --- | --- |
| Solvic 334 | 9.5 to 10.7 |
| Corvic 65/42 | 16.1 to 17.2 |
| Corvic PM | 10 to 12 |
| Equal parts of Corvic 65/42 and Corvic PM | 9.9 to 10.6 |

*Example XI*

A plastisol was prepared by the conventional method from the following materials:

| | Parts |
| --- | --- |
| Polyvinyl chloride (Geon 121) | 500 |
| Dioctyl phthalate | 250 |
| n-Butyl benzyl phthalate (Santicizer #160, Monsanto) | 250 |
| Barium-cadmium soap (Barca 10) | 10 |

Five hundred parts by weight of this plastisol were mixed in a simple open top mixer for several minutes at room temperature to insure uniform distribution of the resin particles in the mixture. Next, about seventy-five parts by weight of liquid trichloro monofluoro methane (Freon 11) foaming agent (temperature about 70° F.) were added and mixed for about three minutes to insure thorough mixing with the fluid plastisol. The resulting composition had a somewhat cloudy appearance due to the presence of the dispersed resin particles suspended in a single liquid phase since the foaming agent and plasticizer were miscible.

Then the plastisol and foaming agent composition was filled into molds directly from the mixer, and various methods of fusing were employed.

The best results from the standpoint of density were obtained by first placing the filled molds in an externally heated oven, maintained at a temperature at 250° F. The molds were left in this oven for five minutes. During this period the volatile foaming agent slowly vaporized and the composition increased in volume, much like the rising of a loaf of bread, to an expanded but unfused foam. The volume of the expanded composition at the end of the oven heating period was about ten times the volume of the composition prior to heating. This high degree of expansion was possible because the composition was unfused and the liquid phase plasticizer was relatively fluid indicating that slight, if any, solvation of the suspended resin particles had occurred.

Following the five minute oven heating or preheating step, each mold was removed from the oven and placed in a Thermax Model 7R dielectric heating apparatus, manufactured by the Girdler Company, Louisville, Kentucky, where a high frequency alternating current field was utilized to very rapidly heat the entire expanded mass to a fusing temperature of about 350° F. At this temperature complete solvation of the resin in the plasticizer occurred and, upon cooling, the desired fused cellular structure vinyl resin resulted. The material was removed from the molds and was found to have a uniform cell structure with predominately interconnecting or open cells and very good resiliency so as to be suitable for seat cushions, mattresses and the like.

The densities of the foamed product from a number of molds processed as outlined were measured and found to average about 6.5 pounds per cubic foot. The lowest density sample was 5.7 pounds per cubic foot. Samples of the same initial composition preheated at temperatures ranging from 200° F. to 240° F. for periods of 5 to 10 minutes exhibited slightly higher densities ranging from about 7 to 9 pounds per cubic foot.

Molds which were filled with this composition and placed in the dielectric heating apparatus for rapid heating from room temperature to 350° F., without preheating to produce an initial expansion, were found to produce a much more dense material with only fair cells indicating that the slow preheating step is quite advantageous particularly where low density is desired. The fusing of such compositions by heating in an oven from room temperature to fusion temperature of from 300° F. to 400° F. with elimination of the rapid dielectric heating step is effective in producing low density fused products because oven heating is essentially slow and expansion can occur during the initial stages before the fusion and solvation commences. However, for thicker sections the two step arrangement is preferred because the poor heat conductivity of the foam may result in fusion and solvation of the outer portions of the mass before complete expansion of the interior has occurred, and this is likely to result in a non-uniform structure. The initial preheat is preferably carried out in an oven, but, if desired, a dielectric heating apparatus may be used to heat the material stepwise first to lower temperatures for complete expansion while in a fluid state and finally to fusing temperature.

*Example XII*

To five hundred parts by weight of the plastisol of Example XI varying amounts of liquid trichloro monofluoro methane (Freon 11) were added in order to determine the optimum quantity of this foaming agent to use. Forty-five parts by weight of liquid agent produced a fair cell structure and expansion when an oven preheat of three minutes at 275° F. followed by dielectric heating to 350° F. was employed. The product density was 5.6. This composition, however, gave negative results in other instances with very little expansion and poor cell structure.

Similar plastisol compositions with fifty-eight parts by weight of the liquid foaming agent to five hundred parts of plastisol produced good results with a five minute 250° F. preheat and a dielectric heating fusing at 350° F. Densities were slightly higher ranging from 7.2 to 9.6 but cell structure was much better than in the case of the compositions employing forty-five parts by weight of foaming agent.

One hundred fifteen parts by weight of the liquid foaming agent were mixed with four hundred parts of plastisol, and the composition was fused using an oven preheat. The fused foam density was about seven pounds per cubic foot, but the cell structure was not as good as in foams produced from compositions containing less foaming agent.

The best results were obtained utilizing sixty-five parts by weight of liquid foaming agent to five hundred parts of plastisol. The preheat was from four to five minutes in a 250° F. oven, and it was followed by dielectric heating to about 350 F. for about one minute. A post fusing step consisting of maintaining the fused foam at a temperature of 310° F. for seven minutes before cooling to room temperature was also employed. This preferred expansion and fusion procedure is very well adapted to be carried out on a continuous basis by passing filled molds on a conveyor first through a preheat oven, then through a dielectric heating zone and finally through a post fusing oven.

Where it is desired to produce a continuous sheet of foam the compositions of this invention may be flowed on to an endless belt and conveyed through heating apparatus for time and temperature controlled heating and the fused foam sheet stripped off at the belt upon emergence from the heating zone, either before or after complete cooling has occurred.

*Example XIII*

The plastisol of Example XI was mixed with liquid methylene chloride ($CH_2Cl_2$). Forty-two parts by weight of the liquid agent to five hundred parts of plastisol were utilized, and the composition was fused at 350° F. following a five minute oven preheat at 250° F. A fused foam having a high density and a rather poor cell structure was produced.

Compositions containing about seventy parts by weight of methylene chloride for each five hundred parts of plastisol produced similar results both with a five minute 250° F. oven preheat followed by a dielectric fusion and with the preheat step eliminated.

Compositions containing about one hundred parts of methylene chloride foaming agent for each five hundred parts of plastisol (about 20% by weight) produced foams having fair cell structure and having densities somewhat higher than those obtained utilizing dichloro monofluoro methane (Freon 11) as the foaming agent and optimum fusing conditions. Best results were obtained with a 250° F. five minute oven preheat.

*Example XIV*

Eighty parts by weight of carbon tetrachloride were admixed with five hundred parts by weight of the plastisol of Example XI and dielectrically fused at 350° F. following a 250° F. oven preheat. Fused foam having a high density and a rather poor cell structure was obtained. These results indicate that the lower boiling foaming agents tend to produce less dense foams having better cell structure, but that the higher boiling agents such as carbon tetrachloride which boils at about 170° F. are suitable if higher density materials are desired.

What is claimed is:

1. A composition suitable for forming an expanded vinyl resin foam of cellular structure upon heating including a vinyl resin plastisol comprising a finely divided vinyl resin containing a predominant amount of vinyl chloride polymerized therein and suspended in an organic plasticizer for the said resin; and a foaming agent for the said plastisol comprising a polyhalogenated saturated hydrocarbon having an atmospheric boiling point between about −40° F. and about +175° F. and being chemically inert with respect to the plasticizer and the vinyl resin, and being substantially completely soluble in the said plasticizer when in the liquid state.

2. The composition of claim 1 in which the various ingredients specified are present in the following proportions:

| | Parts by weight |
|---|---|
| Plasticizer | 30 to 70 |
| Polyhalogenated saturated hydrocarbon | 10 to 25 |
| Vinyl resin | 30 to 70 |

3. The composition of claim 2 in which the average size of the vinyl resin particles is between 0.02 and 2 microns in diameter.

4. The composition of claim 2 in which the vinyl resin contains from 60 to 100% by weight of vinyl chloride polymerized therein.

5. The composition of claim 2 wherein the vinyl resin is polyvinyl chloride.

6. The composition of claim 2 in which the polyhalogenated saturated hydrocarbon has at least two carbon atoms per molecule, and between 2 and 6 inclusive halogen atoms bonded to said carbon atoms.

7. A composition suitable upon heating for forming an expanded vinyl resin foam of solid cellular structure, said composition being a two-phase system, the liquid phase comprising an organic plasticizer and at least one polyhalogenated saturated hydrocarbon having an atmospheric boiling point below about 175° F. dissolved in said plasticizer, and the solid phase of said system comprising a finely divided vinyl resin containing a predominant amount of vinyl chloride polymerized therein, said resin being suspended in the liquid phase in amounts to provide a free-flowing fluid plastisol, foamable upon heating to elevated temperatures.

8. The composition of claim 7 in which the various ingredients are present in the following proportions:

| | Parts by weight |
|---|---|
| Plasticizer | 30 to 70 |
| Polyhalogenated saturated hydrocarbon | 10 to 25 |
| Vinyl resin | 30 to 70 |

9. The composition of claim 8 in which the vinyl resin contains between 60 to 100% by weight of vinyl chloride.

10. The composition of claim 8 wherein the vinyl resin is polyvinyl chloride.

11. The composition of claim 8 in which the polyhalogenated saturated hydrocarbon has at least two carbon atoms per molecule and between 2 and 6 inclusive halogen atoms bonded to said carbon atoms.

12. A composition suitable upon heating for forming an expanded vinyl resin foam of solid cellular structure, said composition being a three-phase system, the solid phase of said system comprising a finely divided vinyl resin containing a predominant amount of vinyl chloride polymerized therein, said resin being suspended in a liquid phase, and said liquid phase comprising predominately an organic plasticizer for said vinyl resin and a vapor phase comprising at least one vaporized polyhalogenated saturated hydrocarbon having a boiling point above about −40° F.

13. The composition of claim 12 in which the various ingredients are present in the following proportions:

| | Parts by weight |
|---|---|
| Vinyl resin | 30 to 70 |
| Plasticizer | 30 to 70 |
| Polyhalogenated saturated hydrocarbon | 10 to 25 |

14. The composition of claim 13 in which the vinyl resin contains between 60 to 100% by weight of vinyl chloride polymerized therein.

15. The composition of claim 13 in which the vinyl resin is polyvinyl chloride.

16. The composition of claim 13 in which the polyhalogenated saturated hydrocarbon has at least two carbon atoms and between 2 and 6 inclusive halogen atoms bonded to said carbon atoms.

17. A process of forming foamed vinyl resin of solid cellular structure which comprises dispersing in a free-flowing plastisol maintained at a temperature substantially below its fusion temperature and at a pressure below 100 p.s.i., said plastisol including a finely divided vinyl resin containing a predominant amount of vinyl chloride polymerized therein and an organic plasticizer for said resin, a polyhalogenated hydrocarbon having an atmospheric boiling point between about −40° F. and about +175° F. and being chemically inert with the resin and the plasticizer, and being substantially completely soluble in the said plasticizer when in the liquid state forming a free-flowing, expanded, low density foam from the mixture by exposure to a temperature substantially above the atmospheric boiling point of the said polyhalogenated hydrocarbon, heating the low density foam to at least the fusion temperature of the plastisol to effect solvation of the resin in the plasticizer and fuse the plasticized resin and then cooling the fused foam to form the foamed vinyl resin of solid cellular structure.

18. The process of claim 17 in which the vinyl resin contains from 60 to 100% by weight of vinyl chloride polymerized therein.

19. The process of claim 17 in which the vinyl resin is polyvinyl chloride.

20. The process of claim 17 in which the polyhalogenated saturated hydrocarbon has at least two carbon atoms per molecule and from 2 to 6, inclusive, halogen atoms bonded to said carbon atoms.

21. The process of forming a vinyl resin foam of solid cellular structure which comprises forming a two-phase system including as the liquid phase, a liquid organic plasticizer and a polyhalogenated saturated hydrocarbon having an atmospheric boiling point between about −40° F. and about +175° F. dissolved in the plasticizer and as the solid phase, finely divided solid particles of a vinyl resin containing a predominant amount of vinyl chloride polymerized therein, said solid resin particles being suspended in said liquid phase, changing the ambient conditions on said two-phase system to vaporize the polyhalogenated saturated hydrocarbon and form a three-phase fluid foam, applying additional heat to effect solvation of the resin particles in the plasticizer forming a two-phase foam of plasticized vinyl resin and vaporized polyhalogenated hydrocarbon and fuse the said plasticized resin and then cooling the resultant cellular mass to form said vinyl resin foam of solid cellular structure.

22. The process of claim 21 in which the vinyl resin contains between 60 and 100% by weight of vinyl chloride polymerized therein.

23. The process of claim 21 in which the polyhalogenated saturated hydrocarbon has at least two carbon atoms and between 2 and 6, inclusive, halogen atoms bonded to said carbon atoms.

24. A process of forming foamed vinyl resin of solid cellular structure which comprises dispersing a polyhalogenated saturated hydrocarbon foaming agent in gaseous state and from an external source in a free-flowing plastisol maintained at a temperature substantially below its fusion temperature, the dispersing of said foaming agent in the plastisol being carried out at a pressure less than 100 p.s.i., said plastisol including a vinyl resin containing a predominant amount of vinyl chloride polymerized therein and an organic plasticizer for said resin, said foaming agent having an atmospheric boiling point above about −40° F., next expanding the plastisol by reducing the pressure thereon to produce a free-flowing, low density, three-phase fluid foam, heating the low density fluid foam to the fusion temperature of the plastisol to effect solvation of the resin in the plasticizer, and then cooling the fused foam to form the foamed vinyl resin of solid cellular structure.

25. A process of forming foamed vinyl resin of solid cellular structure which comprises forming a free-flowing, three-phase system in which the liquid phase comprises a plasticizer for the resin, the solid phase comprises minute particles of a vinyl resin containing a predominant amount of vinyl chloride polymerized therein and the gaseous phase comprises a polyhalogenated saturated hydrocarbon having an atmospheric boiling point above about −40° F. and below about +175° F. and being chemically inert with respect to the plasticizer and the resin, said three-phase system being formed at a pressure below about 100 p.s.i.g. and at a temperature substantially below the fusion temperature of the resin in the plasticizer, heating said three-phase system to said fusion temperature to form a two-phase cellular system, and next cooling the two-phase system to a lower temperature to solidify the two-phase cellular system.

26. The process of claim 25 in which the solid phase of the three-phase system is a vinyl resin which contains between 60 and 100% by weight of vinyl chloride polymerized therein.

27. The process of claim 25 in which the gaseous phase of the three-phase system is a polyhalogenated saturated hydrocarbon having at least two carbon atoms per molecule and between 2 and 6, inclusive, halogen atoms bonded to the said carbon atoms.

28. A process for forming a resin foam of solid cellular structure which comprises dissolving in a vinyl resin plastisol a volatile polyhalogenated saturated hydrocarbon at least in partially liquid state but at a pressure below 100 p.s.i., said foaming agent having an atmospheric boiling point between about −40° F. and about +175° F. and being chemically inert with respect to the plastisol constituents, exposing the thus-treated plastisol to a temperature above the boiling point of the said foaming agent to form an expanded, free-flowing three-phase fluid foam, then heating the fluid foam to the fusion temperature of the plastisol to effect solvation of the resin in the plasticizer, and then cooling the thus-treated foam.

References Cited in the file of this patent

UNITED STATES PATENTS

| | | |
|---|---|---|
| 2,283,604 | Harrison | May 19, 1942 |
| 2,409,910 | Stober | Oct. 22, 1946 |
| 2,567,979 | Taylor | Sept. 18, 1951 |
| 2,666,036 | Schwerke | Jan. 12, 1954 |
| 2,681,321 | Stastny et al. | June 15, 1954 |
| 2,763,475 | Dennis | Sept. 18, 1956 |
| 2,901,446 | Hawkins | Aug. 25, 1959 |